United States Patent [19]

Aumard

[11] Patent Number: 4,785,673
[45] Date of Patent: Nov. 22, 1988

[54] STRAIN-GAUGE SENSOR FOR MEASURING FORCES

[75] Inventor: Jean-Pierre Aumard, Annemasse, France

[73] Assignee: S.C.A.I.M.E., Annemasse, France

[21] Appl. No.: 940,516

[22] Filed: Dec. 10, 1986

[30] Foreign Application Priority Data

Dec. 17, 1985 [CH] Switzerland ..................... 5381/85

[51] Int. Cl.⁴ .............................................. G01L 1/22
[52] U.S. Cl. ................................................ 73/862.65
[58] Field of Search ........... 73/862.04, 862.05, 862.06, 73/862.65; 177/211, 229

[56] References Cited

U.S. PATENT DOCUMENTS 3,096,644  7/1963  Seed ................................. 73/862.65
3,499,500  3/1970  Harding ......................... 177/211 X
4,628,745 12/1986  Hatamura ........................ 73/862.04

Primary Examiner—Charles A. Ruehl
Attorney, Agent, or Firm—Ladas & Parry

[57] ABSTRACT

The sensor is formed of a hollow profile (1) of rectangular cross-section, which has two symmetrical transverse notches (2, 3) and two other symmetrical transverse notches (4, 5) at a distance from the first. These notches pass through the thickness of the large side walls (6) of the profile and, in the case of each pair (2,3 and 4, 5), leave intact but mechanically weakened regions (8) between them, to which strain gauges (9) are fixed.

7 Claims, 3 Drawing Sheets

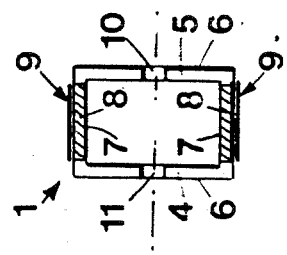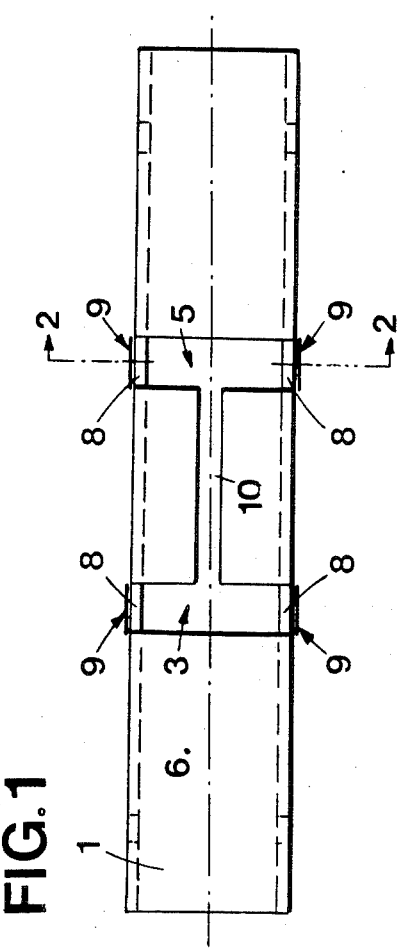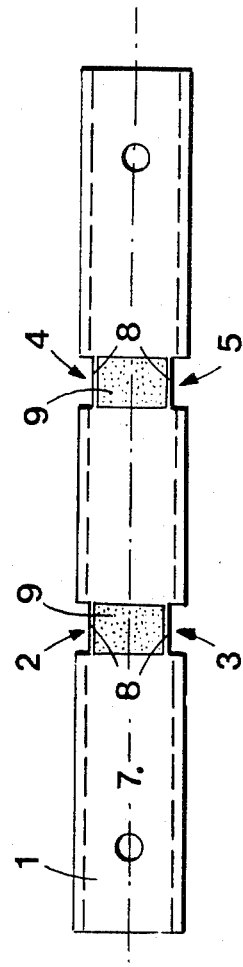

STRAIN-GAUGE SENSOR FOR MEASURING FORCES

BACKGROUND OF THE INVENTION

The invention relates to a strain-gauge sensor.

Strain-gauge sensors for measuring forces are already known. One is a metal block in which one or more recesses have been made so as to form one or more weakened parts on which one or more strain gauges are arranged. A sensor of this kind is described in French Pat. No. 2,509,465 and in its Addition No. 2,527,768. According to these, a recess is produced in a parallelepipedal metal block by milling. Sensors of this type manufactured on a very large scale, for scales, for example, are expensive because of the quantity of metal and the massive milling operations required.

SUMMARY OF THE INVENTION

The object of the present invention is, therefore, to provide a strain-gauge sensor for measuring forces which is inexpensive and simple to manufacture.

For this, a sensor has a hollow profile of rectangular cross section having at least two transverse notches symmetrically relative to one another respectively in opposite side wall portions of the profile. The notches pass through the thickness of the side wall portions they are in, but leave intact weakened profile regions therebetween. A strain gauge is fixed to one of the weakened regions.

DESCRIPTION OF THE DRAWING

The attached drawing shows, by way of example, three embodiments of the sensor according to the invention, in which:

BRIEF DESCRIPTION OF THE INVENTION

FIG. 1 is a side view of the first embodiment.

FIG. 2 is a view in cross-section along 2—2 of FIG. 1.

FIG. 3 is a plan view corresponding to FIG. 1.

Figure 4:
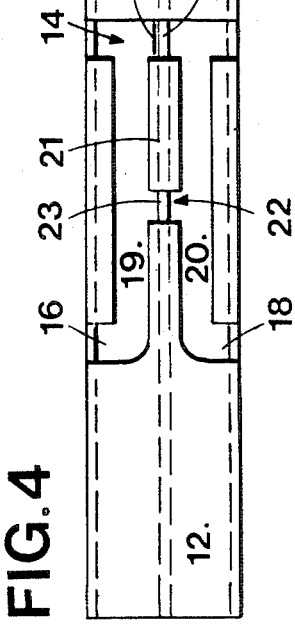

FIG. 4 is a side view of the second embodiment.

Figure 5:
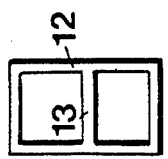

FIG. 5 is an end view corresponding to FIG. 4.

Figure 6:
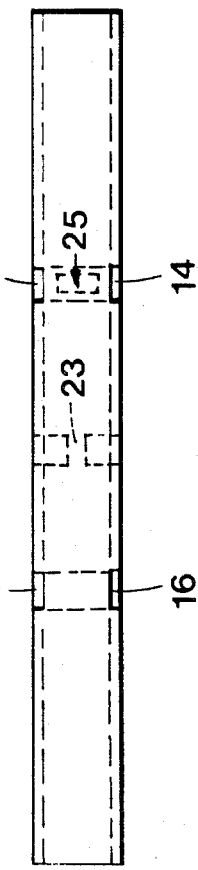

FIG. 6 is a plan view corresponding to FIG. 4.

Figure 7:
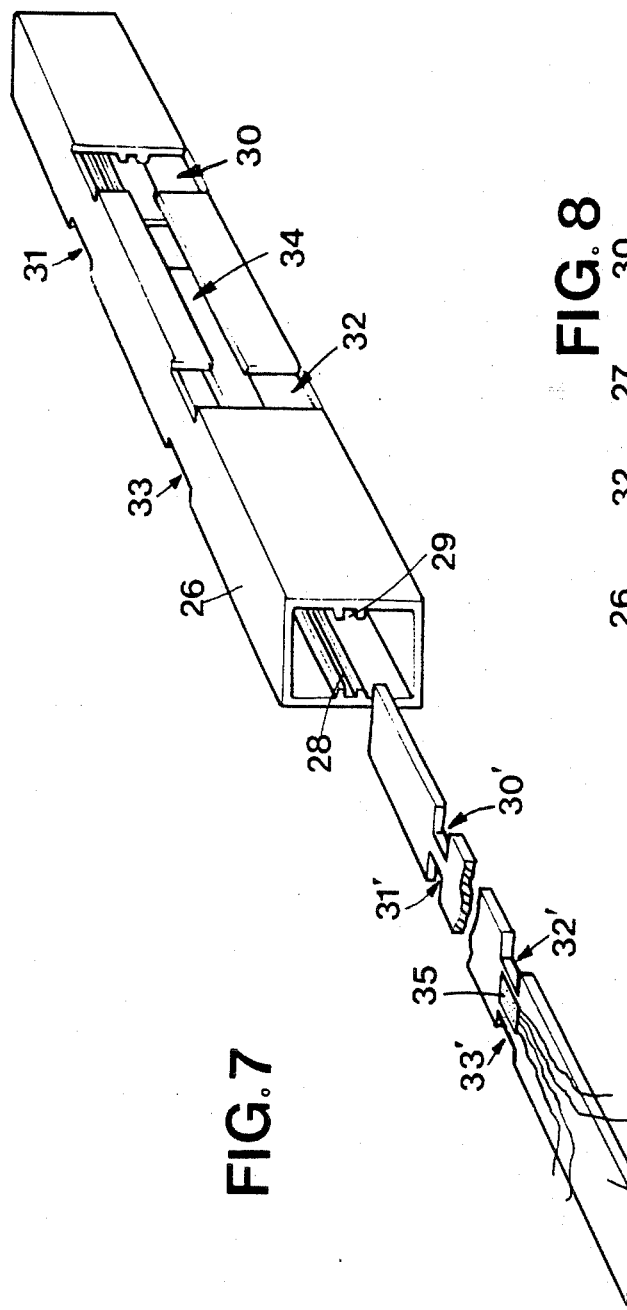

FIG. 7 is a view in perspective of the third embodiment.

Figure 8:
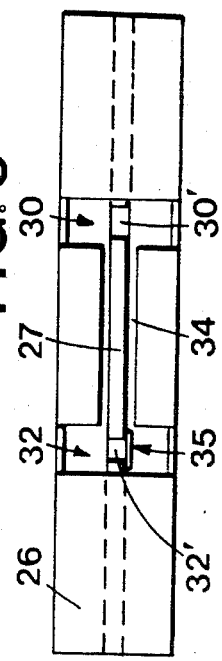

FIG. 8 is a plan view, on a smaller scale, corresponding to FIG. 7.

PREFERRED EMBODIMENTS OF THE INVENTION

The sensor shown in FIGS. 1 to 3 consists of a hollow metal profile 1 of rectangular cross-section, as seen in FIG. 2. Two pairs of rectangular transverse notches, shown at 2, 3 and 4, 5 respectively, have been made in this profile; their depth is sufficient for each of them to pass right through the thickness of one of the large side walls 6, so that, at the location of these notches, the small side walls 7 are reduced to two intact regions forming bridges 8, these constituting weakened parts on which strain gauges 9 are fixed. The notches 3 and 5 are joined by a longitudinal notch 10. Likewise, the symmetrical notches 2 and 4 are joined by a longitudinal notch 11.

The perfectly symmetrical arrangement of the notches and of the positions occupied by the four strain gauges will be noted.

In the second embodiment, a hollow metal profile of rectangular cross-section, shown at 12, has a median longitudinal inner wall 13, notches having been made in the said profile in the following manner. A first pair of symmetrical transverse notches have been made at 14, 15, their depth being sufficient to pass through the thickness of the corresponding large side wall.

Two symmetrical transverse notches 16, 17 have been made over less than half the height of the large side faces. Two other symmetrical transverse notches, only one of which can be seen at 18, have been made in the extension of the notches 16, 17 and again over a length which is less than half the height of the large side faces. Two longitudinal notches 19, 20 have been made in each of the large side faces so as to join together on the one hand the notches 14, 16 and on the other hand the notches 14, 18. The bridge formed on each of the large side faces, only one of which bridges can be seen at 21, is itself also notched transversely, as shown at 22, so that only a bridge 23, consisting of the median wall 13, is left at this location. Furthermore, the right-hand end of this median wall 13, as shown in FIG. 4, forms a bridge 24 on which a strain gauge 25 or a bridge of gauges has been fixed.

The purpose of the bridge 23 is to transmit to the element 21 the deformations in the vertical plane of the parallelogram whose vertices, in FIG. 4, are at the locations of the four deformable parts of the small faces in between the notches.

In a variant, the connection between the notches 14 and 18, 14 and 16, 15 and 17 etc. could be of a different form from that shown. The essential point is that this connection determines weakened parts on the median wall 13, the strain gauge 25 being arranged on one of these parts.

In the embodiment according to FIGS. 7 and 8, a hollow metal profile of rectangular cross-section, shown at 26, has a median longitudinal inner wall consisting of an elongate metal plate or strip 27 which is to be engaged and fixed (by adhesive bonding or some other means) in two longitudinal slides 28, 29 provided opposite one another inside the profile 26.

A first pair of symmetrical transverse notches 30, 31 have been made in the profile 26. Their depth is sufficient to pass through the thickness of a corresponding large side wall.

A second pair of symmetrical transverse notches, similar to the first, have been made at 32, 33 in the profile 26.

A longitudinal notch has been made in each of the large faces of the profile 26. Only one of these symmetrical notches can be seen at 34. One of these notches 34 joins the notches 30 and 32 and the other joins the symmetrical notches 31, 33.

FIG. 7 shows the plate 27 before it has been definitively inserted into the profile 26 and after a strain gauge or a bridge of strain gauges has been fixed to it, as shown at 35.

The plate 27 has symmetrical notches 30', 31' and 32', 33', which are made after the plate 27 has been provisionally inserted into the profile 26, when the respective notches 30, 31 and 32, 33 are made.

In the example shown in FIGS. 4 to 6, the work involved in positioning the strain gauges against the notched parts of the median partition 13, for examples as shown at 25, is rather difficult and lengthy, all the more so because the connecting wires subsequently have to be passed into the profile 12. In the case shown in FIGS. 7 and 8, this disadvantage is completely avoided. The strain gauges, such as 35, can be positioned in series (together with their connecting wires) on plates 27, at the locations of the weakened parts of these plates (FIG. 7). These plates are then pressed together, after which each plate 27 is inserted into a profile 26, when it is definitively fixed in the slides 28, 29 by adhesive bonding or some another means.

In a variant, the cross-section of the profile used may be other than rectangular, for example polygonal, provided that the transverse notches are made in a symmetrical manner and together determine weakened regions on one or more walls of the profile.

What is claimed is:

1. A strain-gauge sensor for measuring forces, comprising:
   a hollow profile (1) of substantially rectangular cross section and having at least a first two transverse notches (2, 3) in opposite side walls (6) of the profile arranged symmetrically relative to one another and each passing through the thickness of the side wall thereof for leaving intact two mechanically weakened, planar regions (8) of the profile therebetween,
   wherein the cross section of the profile (1) is a non-square rectangle for the profile to have, alternating circumferentially, two large and two small side walls (6, 7), and
   wherein the transverse notches (2, 3) are elongated rectangles on the two large side walls (6) of the profile with their elongated directions perpendicular to the two small side walls (7) of the profile and extend wholly across the large side walls (6), whereby the weakened regions (8) are formed by symmetrical strips of the small side walls (7) between the transverse notches (2, 3); and
   a strain-gauge (9) fixed to one of the weakened regions (8) of the profile.

2. The sensor as claimed in claim 1, wherein the transverse notches (2, 3) comprise a second two of the transverse notches (4, 5) spaced from the first two transverse notches (2, 3) for leaving intact four of the weakened regions (8), and further comprising two longitudinal notches (10, 11) respectively in the large side walls (6) and intersecting middles of the first and second transverse notches (2,3; 4, 5), and other strain gauges (9) respectively fixed to each of the three, other weakened regions (8).

3. A strain-gauge sensor for measuring forces, comprising:
   a hollow profile (12) of substantially rectangular cross section and having at least a first two transverse notches (14, 15) in respective, opposite side walls of the profile arranged symmetrically relative to one another and each passing through the thickness of the side wall thereof for leaving intact two mechanically weakened, planar regions of the other side walls of the profile between the opposite side walls,
   wherein the profile (12) further comprises a median longitudinal inner wall (13) parallel to the other side walls of the profile and extending at least substantially between the opposite side walls for the first transverse notches (14, 15) to produce a local weakened part (24) on the inner wall (13) at the first transverse notches; and
   a strain gauge on the local weakened part (24) of the inner wall (13).

4. The sensor as claimed in claim 3,
   wherein the cross section of the profile (12) is a non-square rectangle for the profile to have, alternating circumferentially, two large and two small side walls,
   wherein the first two transverse notches (14, 15) extend across the large side walls and the transverse notches comprise four other, symmetrical transverse notches (16, 17; 18) spaced from the first two transverse notches (14, 15) for leaving intact four of the weakened regions, each of the four other transverse notches extending from one of the small side walls only over less than half the width of the large side wall it is in to ends thereof, and
   further comprising four longitudinal slots (19, 20) in the large side walls respectively joining the ends of the four other transverse notches (16-18) to the first transverse notches (14, 15) respectively spaced therefrom, whereby portions of the large side walls remain in the spaces between the first and other transverse notches along the inner wall.

5. The sensor as claimed in claim 4,
   wherein the transverse notches further comprise a third, symmetrical two of the transverse notches (22) respectively in the remaining portions of the large side walls between the first and other transverse notches (14, 15; 16-18) to form a weakened part (23) on the inner wall (13).

6. A strain gauge sensor for measuring forces, comprising:
   a hollow profile 26 of substantially rectangular cross section and having at least a first two transverse notches (30, 31) in respective, opposite side walls of the profile arranged symmetrically relative to one another and each passing through the thickness of the side wall thereof for leaving intact two mechanically weakened, planar regions of the profile therebetween, and a second two of the transverse notches (32, 33) spaced from the first two;
   an elongate plate median wall (27) fixed on longitudinal slides (28, 29) on the insides of the opposite side walls of the hollow profile for having first and second local weakened parts between transverse notches (30′, 31′, 32′, 33′) corresponding to the first and second transverse notches (30, 31 and 32, 33); and
   at least one strain gauge fixed to one of the local weakened parts.

7. The sensor as claimed in claim 6, and further comprising two longitudinal notches respectively in the opposite side walls and intersecting middles of the first and second transverse notches.

* * * * *